Patented Nov. 13, 1923.

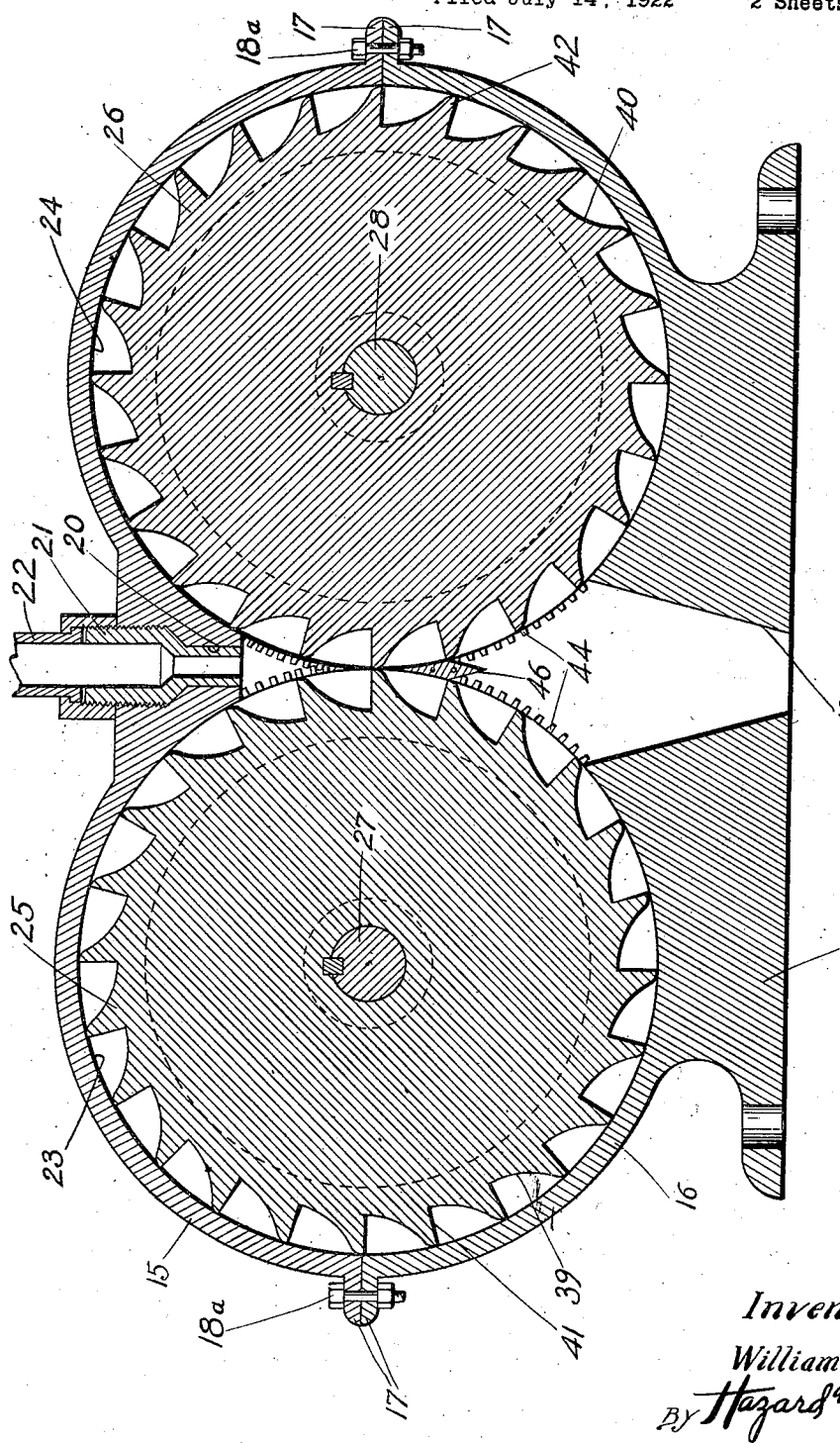

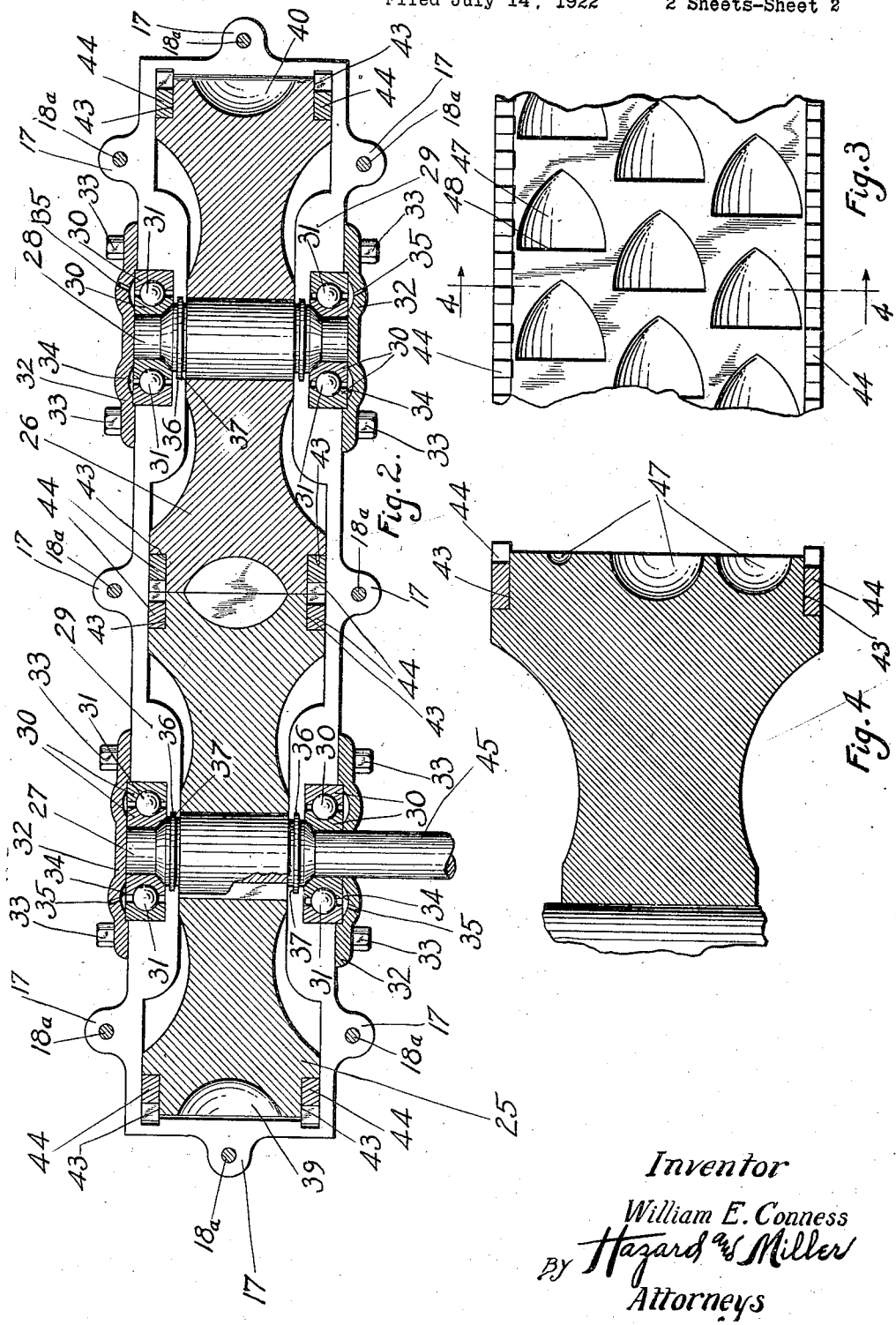

1,474,318

UNITED STATES PATENT OFFICE.

WILLIAM E. CONNESS, OF LOS ANGELES, CALIFORNIA.

DUPLEX TURBINE MOTOR.

Application filed July 14, 1922. Serial No. 574,884.

*To all whom it may concern:*

Be it known that I, WILLIAM E. CONNESS, a citizen of the United States, residing at Los Angeles, in the county of Los Angeles and State of California, have invented new and useful Improvements in Duplex Turbine Motors, of which the following is a specification.

My invention relates to fluid turbines, and the purpose of my invention is the provision of a turbine which is capable of attaining a peripheral speed equal to the velocity of the propelling fluid at the point of intake.

It is also a purpose of my invention to provide a turbine which will allow a wide range of size, speed and power in its construction and which is admirably adapted to withstand the usage to which such devices are ordinarily subjected, at the same time being extremely simple in construction and economical in use.

Although I will describe only two forms of fluid turbines embodying my invention and point out the novel features thereof in the claim, it is to be understood that various changes and modifications may be made herein without departing from the spirit of the invention and the spirit and scope of the appended claim.

In the drawings,

Figure 1 is a view showing in vertical longitudinal section one form of fluid turbine embodying my invention;

Figure 2 is a horizontal longitudinal section of the turbine shown in Figure 1;

Figure 3 is a fragmentary plan view of a portion of the periphery, showing the modified construction of the periphery with one of the wheels embodied in the turbine shown in that figure;

Figure 4 is a sectional view taken on the line 4—4 of Figure 3;

Similar reference characters refer to similar parts in each of the several views.

Referring specifically to the drawings my invention in its present embodiment comprises a casing divided longitudinally to provide an upper section 15 and a lower section 16, the two sections being secured together at intervals by means of companion lips 17 and bolts 18ª extending through the lips. The lower section includes a base 18 provided with a fluid discharge port 19, and the upper section 15 is provided with an intake port 20 in which is mounted an inlet 21 connected with a fluid supply pipe 22. As clearly shown in Figure 1, the sections of the casing are formed to provide circular compartments 23 and 24 disposed in the same vertical plane and communicating with each other at points between the intake and discharge ports 19 and 20.

Within the compartments 23 and 24, wheels 25 and 26, respectively, are adapted to operate, and as clearly shown in Figure 2 the wheels are provided with shafts 27 and 28. respectively, which are journaled in the walls of the casing to rotatably sustain the wheels within the compartments. The shafts 27 and 28 are preferably formed separately from the wheels and keyed thereto, as clearly shown in Figure 1. The side walls of the casing are provided with thickened portions 29 which are formed with recesses to receive the ends of the shafts 27 and 28 and which are recessed to accommodate bearings. These bearings in the present instance comprise raceways 30 for receiving balls 31, and the bearings are removably secured within the recesses by means of plates 32 secured to the side walls of the casing by means of bolts 33. As clearly shown in Figure 2, the plates are formed on their inner faces with annular recesses or channels 34 that coincide with the openings between the raceways 30 so as to have direct communication with the balls 31. These channels 34 are for the purpose of lubrication, oil being introduced into the channels 35 formed in the plates 32.

For the purpose of preventing the leakage of the propelling fluid from the casing around the shafts, packing rings 36 are provided adjacent opposite ends of the shafts 27 and 28. These packing rings are seated in annular grooves 37 formed in the thickened portions 29.

As clearly shown in Figures 1 and 2, the wheels 25 and 26 are provided at their peripheries with pockets 39 and 40, respectively, these pockets being arranged at regular spaced intervals and each pocket gradually increasing in depth from one end to the other so as to provide between any two adjacent pockets a radially disposed blade 41 or 42. It is to be particularly noted that the pockets 39 of the wheels 25 are reversely arranged with respect to the pockets 40 of the wheel 26 so that they will cooperate with each other to successively provide fluid receiving chambers at a point directly in front of the intake port 20, as will be more fully described hereinafter.

It is preferable, although not necessary, to provide a positive driving connection between the wheels 25 and 26 and to this end the marginal edges of the two wheels are recessed, as indicated at 43 in Figure 4, for the purpose of receiving ring gears 44. These ring gears are suitably secured to the wheels and in such manner that the teeth of one pair of gears for one wheel constantly mesh with the teeth of the gears of the other wheel. The power from the two wheels is transmitted to a point exteriorly of the turbine through the medium of an extension 45 of the shaft 27, such extension projecting through the corresponding wall of the casing as clearly shown in Figure 2.

For the purpose of confining the propelling fluid within the pockets of the turbine wheels for a period sufficient to completely utilize the propelling force of the fluid, I provide a deflecting member 46 which, as clearly shown in Figure 1, is secured within the casing at a point between the compartments 23 and 24, so as to successively form closures for the complementary pockets of the two wheels. This deflecting member is substantially diamond-shaped in cross section, so as to allow of the proper exhaust of the fluid from the pockets after the force of the fluid has been spent in rotating the wheels.

In operation, the propelling fluid, such as steam, water, air or the like, is supplied to the nozzle 21 from the pipe 22 so that the fluid passes from the intake port 20 into the casing between the peripheries of the wheels 25 and 26. Upon entering the casing, the propelling fluid passes into the chambers formed by the complementary pockets of the two wheels, thereby impinging upon the corresponding blades so as to exert its force upon the blades in effecting rotation of the two wheels in opposite directions, as indicated by the arrows in Figure 1. During rotation of the wheel, the propelling fluid is successively admitted to the chambers formed by the pockets so as to successively act upon the blades, the fluid being confined within the pockets by means of the deflecting member 46 and thereby completely utilizing the propelling force of the fluid. After any one pair of blades has traversed the deflecting member 46, the propelling fluid is liberated from the pockets, thereby exhausting from the casing through the exhaust port 19.

It is to be particularly noted that as the wheels 25 and 26 rotate any pair of pockets 39 and 40 disposed adjacent to the intake port 20 provides a relatively large chamber for the reception of the propelling fluid, and as this pair of pockets moves downwardly the chamber formed by the pockets is gradually reduced in area by the movement of the blades toward each other so that when the pockets reach the plane which coincides with the plane of the shafts, the chamber is closed at its bottom, thereby presenting a substantially solid wall against which the propelling fluid acts. By this operation, the propelling force of the fluid is completely consumed, so that it is possible to attain a peripheral speed of the wheels which is equal to the velocity of the fluid at the point of intake. This obviously materially increases the efficiency of the turbine, while at the same time utilizing the force of the fluid to propel both of the wheels.

It will be manifest that by virtue of the ring gears 44 a positive driving connection between the wheels 25 and 26 is effected so that, during the operation of the turbine, the wheels rotate in synchronism at all times. This obviously insures the blades and pockets of one wheel maintaining proper position with respect to the blades and pockets of the other wheel, so that the successive forming of the chambers between the wheels is at all times insured.

Any number of blades or pockets may be provided in the peripheries of the two wheels. For example, as shown in Figures 3 and 4, I have provided a wheel with three annular series of pockets and blades designated at 47 and 48, respectively. The blades and pockets are in the present instance arranged in staggered relation, but it is to be understood that these elements may be arranged in any manner desired. It will be clear that by increasing the number of blades and pockets a material increase in driving force of the propelling fluid is effected without a corresponding increase in the diameter or speed of the turbine.

I claim:

In a fluid turbine, a pair of wheels disposed in the same plane and having their peripheries arranged in close proximity to each other, each of said wheels being provided with peripheral blades and annular recesses at opposite sides thereof, and ring gears secured to the wheels within said recesses so that the gears of one wheel constantly mesh with the gears of the other wheel.

In testimony whereof I have signed my name to this specification.

WILLIAM E. CONNESS.